March 23, 1937.   M. A. KNIGHT ET AL   2,074,551
COOLING AND ABSORPTION TOWER
Filed Jan. 29, 1936
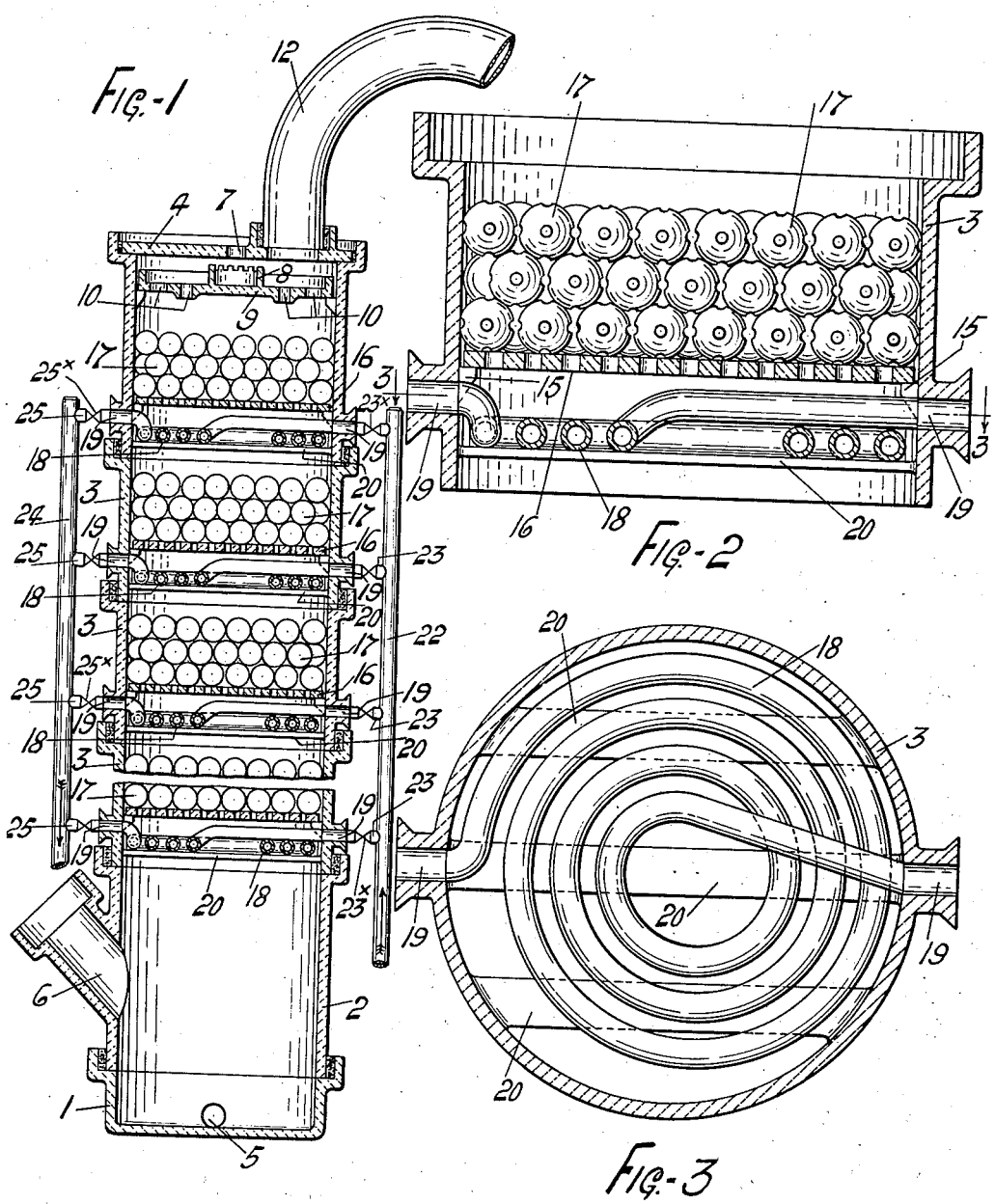
INVENTORS
MAURICE A. KNIGHT
FREDERICK M. KLEIN Patented Mar. 23, 1937

2,074,551

UNITED STATES PATENT OFFICE 2,074,551

COOLING AND ABSORPTION TOWER

Maurice A. Knight, Akron, Ohio, and Frederick M. Klein, New York, N. Y.

Application January 29, 1936, Serial No. 61,370

2 Claims. (Cl. 23—283)

The present invention relates to cooling and absorption towers and particularly to apparatus of this type which is used in the chemical industries for the recovery of all types or kinds of acids, alkalies and other chemicals or for similar purposes.

The invention more especially relates to absorption apparatus which is usually made in the form of a tower or stack and which is used in the recovery of gases generated in industrial chemical processes. Towers of this type are usually made of an acid and alkali resistant stoneware or other siliceous ceramic materials, and the towers herein described are intended and designed to be made of a material which will resist any of the chemicals which are treated therein.

The efficiency of coolers of the type shown and described herein resides largely in the rapidity with which the liquids and gases may be cooled, and by the construction shown herein the liquids and gases are cooled more efficiently and thus make possible the absorption of gases more rapidly than with other known forms of coolers. The absorption of the gases within the condensate or absorbent generates heat and the cooling means which is employed will absorb the heat generated by this reaction adjacent the point of absorption and give more efficient results. The invention consists in the provision of a cooling or condensing tower in which a coil or circuit of pipe is provided within and transversely of the tower, so that a cooling agent, such as water, brine or the like, may be passed under pressure through the tower and across the streams of gas and condensate.

It is a further object of the invention to construct a cooling tower in which are incorporated at spaced intervals a plurality of coils connected to a source of supply for a liquid cooling agent, the coils being independently controlled and controllable so that the temperature of the coils in different parts of the tower may be regulated to secure the maximum efficiency. By having the several coils connected to a source of supply under pressure independently controlled, it is possible to force the coolant through the coils at high velocity and thus secure the most efficient heat transfer between the liquid and gas to be cooled and the coolant.

The primary object of the invention is to remove the heat from the solution as it is collected in the tower and this object has been secured by the device shown and described herein.

It will be understood that in the following description and in the drawing, the best known or preferred form and embodiment of the invention have been described and shown, but the invention is not necessarily restricted to the exact form shown and may be embodied in other modified forms.

In the drawing:

Figure 1 is a vertical cross section through a tower in which are located several sections which are provided with the improved cooling coils;

Figure 2 is an enlarged vertical section through a single section; and

Figure 3 is a cross section on the line 3—3 of Figure 2 taken just above the cooling coil.

It will be understood that the cooling tower which will be described is merely one form of the invention and the tower may be of any desired height and contain any desired number of sections, of which sections one or more may be of the improved type having the cooling coil located therein.

A tower of this type is preferably made of acid or alkali resistant stoneware, although any material which is sufficiently resistant to the chemicals to be treated may be employed. The tower consists of a base section 1, a bottom section 2 which is usually free of fillers, a plurality of intermediate sections 3 and a cover 4. The base and each of the sections may be made with a flaring or bell-shaped mouth as shown to receive the next upper section, or a flanged or butt-end construction may be substituted. These alternative constructions will facilitate removal of individual sections for repair or replacement. Plain sections which are of old or recognized form may be inserted at any point in the tower. In describing the invention in detail, it will be assumed that an acid is to be recovered, but the invention and the description thereof apply to all chemicals to be treated in the tower.

In the section 1 is located the opening 5 through which the condensate may be removed.

The gases which are to be condensed or absorbed and recovered are admitted to the section 2 through the inlet pipe 6, passing thence upwardly through the tower. In passing through the tower, the gases meet a downwardly moving stream which may be a water or weak acid or the like having the property of absorbing the acid or other gases. If an absorbing medium is employed, it is introduced into the top of the tower through an opening 7 into the cup 8 on the distributing plate 9. From the cup 8 the absorbent overflows onto the top of the plate and thence through the openings 10 into the tower.

Any other form of distributing device may be employed.

The tower is filled with any of the usual inert filling mediums which are generally employed for this purpose, and as the absorbent flows over the fillers a large surface contact is provided. The gases which escape from the tower pass out through the pipe 12 and to the stack or to other towers in a series.

So far as has been described, the tower is of the usual or standard construction and as so used in the prior art reliance has been placed upon the cooling effect secured by radiation from the outside of the tower. No tower of this same or general type has been provided with a cooling coil within the tower and placed transversely across the tower through which a coolant may be forced under pressure so as effectively to chill the gases over the whole cross section of the tower.

The more effective cooling of the interior of the tower, and consequently the much increased efficiency, is secured by the incorporation in the tower of a new unit or units which contain the coil as will be now described. One of the units is shown in Figures 2 and 3. The unit consists of the vertical pipe section as shown, in which is located, preferably near the bottom, lugs or supports 15 for a stoneware grate or grid 16 which supports the inert filling medium 17. The grid supports the filling medium and prevents its weight from resting upon the coil 18 which is preferably placed immediately below the grate.

The coil 18 is shown in spiral form, although this is not essential. It is secured in openings 19 in the wall of the section and these openings may be located at any point. The coil is preferably made of a single continuous piece of stoneware and is so designed that substantially all of the cross-sectional area of the tower is subjected to the cooling action of the medium which is passed through the coil. The ends of the coil may be secured in the openings 19 in any desired manner. To support the coil, a light grid 20 may be formed in the base of the section. Although we appear to be the first to make a helical cooling coil of ceramic material, such as stoneware, and to support its ends in the walls of the tower section, our method of forming this unit does not involve a departure from known methods of treating ceramic material since the coil preferably is arranged in the tower section while both are in the plastic state, the coil being first extended in the customary manner, then being wound into proper shape, and then being placed in position in the tower section, after which the unit is dried and baked, all of which is well understood in the treatment of ceramic material. The coils are preferably individually connected to a source of the cooling liquid and, except for special purposes, are not run in series, so that in the usual construction each section will have the maximum cooling effect. The cooling liquid is forced through the pipes under pressure.

As shown in Figure 1, the coolant is conducted through a header 22 from which lateral pipes 23 extend to each coil. A similar header 24 receives the discharge from the coil through the lateral pipes 25. Valves 23$^x$ located in the laterals 23 permit each coil to be independently controlled and check valves 25$^x$ in the laterals 25 prevent back flow from the discharge line.

It is therefore possible to force the coolant through the several coils under pressure and at any desired velocity so as to effect the most efficient heat transfer between the liquid and gas to be cooled and the coolant. It is also possible to control each of the coils independently of the others, and should any coil fail, that coil may be shut off without affecting the operation of the other coils. As the several coils are in parallel and not in series, the coolant may be the same temperature at all points in the tower. It has been proposed to pass a coolant through a tower in the reverse direction of the gas flow, but this has meant that by the time the coolant reaches the base of the tower, its temperature has been raised to such an extent that it is no longer effective at the point of greatest heat.

An especial advantage of the coil form of conduit for the coolant is that in case the tower is not strictly vertical, the condensate which collects on the pipe will not all run to the side and thus tend to flow in channels, but will collect on and drop from several points in the coil.

It will be seen that as the gases pass upwardly through the tower, they pass over and across the coil at all points in the cross section of the tower and similarly the downwardly flowing condensate and absorbent are likewise chilled. As the improved construction introduces the cooling medium directly into and transversely across the tower, the gases and more especially the liquids are cooled more effectively than in the earlier constructions and, consequently, the efficiency of the tower is greatly increased.

As stated above, the disclosure is illustrative of the best known or preferred form of the invention, which may be altered or modified without departing from the spirit or scope thereof as set forth in the claims. When the word "coil" is used in the claims, it will be understood that this is not limited to a spiral formation as the cooling pipe may take any desired or serpentine form.

What is claimed is:

1. As a unit of manufacture, a tower section having portions thereof adapted to interfit with other sections for incorporation in an absorption tower for the treatment of gases, said tower section comprising a vertical ceramic pipe, a hollow spiral cooling coil of a single continuous piece of stoneware extending transversely of the lower portion of the pipe and having inlet and outlet ends integral with openings in the wall of said pipe.

2. An absorption tower for the treatment of gases comprising a plurality of sections, each section comprising a vertical ceramic pipe, a hollow cooling coil consisting of a continuous piece of stoneware formed in a plurality of convolutions and extending in a horizontal plane across the section, the inlet and outlet ends of the pipe being seated in the wall of each section, means for conducting a coolant to the several cooling coils, and means for individually controlling the passage of the coolant through each of the coils.

MAURICE A. KNIGHT.
FREDERICK M. KLEIN.